July 4, 1950  J. E. McDONALD  2,514,205
HELICOPTER ROTOR ARRANGEMENT
Filed May 5, 1948

INVENTOR
JOHN E. McDONALD
BY Oly & Fize
ATTORNEYS

Patented July 4, 1950

2,514,205

UNITED STATES PATENT OFFICE 2,514,205

HELICOPTER ROTOR ARRANGEMENT

John E. McDonald, Newton, Mass., assignor to The Firestone Tire & Rubber Company, Akron, Ohio, a corporation of Ohio Application May 5, 1948, Serial No. 25,232

7 Claims. (Cl. 244—17.11)

This invention relates to helicopter aircraft and is more particularly directed toward improvements in the construction of single lifting rotor helicopters having torque-counteracting tail rotor means offset from the plane of rotation of the lifting rotor.

In single rotor helicopters which use a torque correcting tail rotor to produce a transverse thrust adapted to counteract the driving torque of the main lifting rotor, it has been customary to locate the torque rotor behind the lifting rotor and at an elevation such that its thrust axis lies close to the plane of rotation of the main rotor. By locating the tail rotor thrust approximately in the plane of the main rotor the transverse thrust of the tail rotor balances the torque reaction of the main rotor with practically no tendency to tilt the aircraft laterally because both the lateral component of force from the main rotor and the lateral force from the tail rotor are in the same plane.

In some instances, it is desirable to place the tail rotor in a plane lower than the plane of the lifting rotor. This may occur in cases where it is preferred to keep the overall height of the machine at a minimum. Therefore, the tail rotor may be located to provide only a small amount of ground clearance. In other instances it may be preferred to place the torque rotor means underneath the main rotor in order to take advantage of the more efficient thrust produced by cross-flow and thereby provide a shorter structure for the aircraft. In the latter instance the thrust developed by the tail rotor or rotors is greater than with normal construction since the radius has been reduced. The action of the tail rotor when located in a plane lower than the main rotor is such as to produce a lateral rolling moment causing the craft to fly in a somewhat laterally inclined attitude in order to develop balanced lateral moments and forces.

An object of the present invention is to provide for a helicopter having torque rotor means displaced vertically an appreciable distance from the plane of the main rotor, a construction which will improve the comfort of the occupants and give a better flight attitude for landing and take-off under power operation, thus increasing the ease and safety of operation.

Another object of the present invention is to provide for a helicopter having torque rotor means located appreciably below the plane of the main rotor, a construction which includes means for substantially reducing the lateral inclination which the craft will assume during powered flight. This may be accomplished by providing a lateral offset in the lifting rotor position with respect to the longitudinal center plane of the craft. By properly proportioning the lateral offset of the rotor lift with respect to the center of gravity of the craft a counter moment approximately equivalent in magnitude to the rolling moment developed by the vertical offset of the tail rotor thrust may be produced.

With this offset relationship of the center of rotation of the main rotor relative to the center of gravity, an exact balance can be developed for a selected operating condition. If desired, this condition may be selected as the normal cruising condition. Then with full power applied, such as during certain hovering operations, a slight lateral inclination of the craft may be introduced but this will be small in comparison to the inclination which is produced when no corrective offset is built into the main rotor location. Such a small inclinaton during hovering operation would not be objectionable to the occupants and, in fact, would be scarcely noticeable. During autorotational operation when the thrust of the tail rotors has been reduced to substantially zero, the rolling moment produced by the tail rotor thrust is eliminated. This will result in the craft assuming a slight lateral inclination caused by the main rotor offset during autorotational flight condition. Since the autorotational condition is used in a helicopter only a small portion of the total flight time, an inclination of the fuselage during this operation is less objectionable than the inclination during powered flight operation. Furthermore, if the main rotor offset is arranged to be correct for cruising condition the inclination during autorotational operation will be somewhat less than would be obtained during powered operation if no corrective offset were introduced.

In some instances, for example, in connection with large sized craft with high power and torque, it may be desirable to provide a main rotor offset which will give a mean position for the lateral angular displacement. The rotor offset is therefore selected to provide for about one-half the maximum lateral moment which could be developed under maximum torque conditions. Thus under no condition of operation would the lateral inclination of the machine be greater than approximately one-half the angle which would be present during full power operation with no corrective offset included.

How the objects and advantages of this invention are attained will be evident from the following description of the drawings in which—

Figure 1:
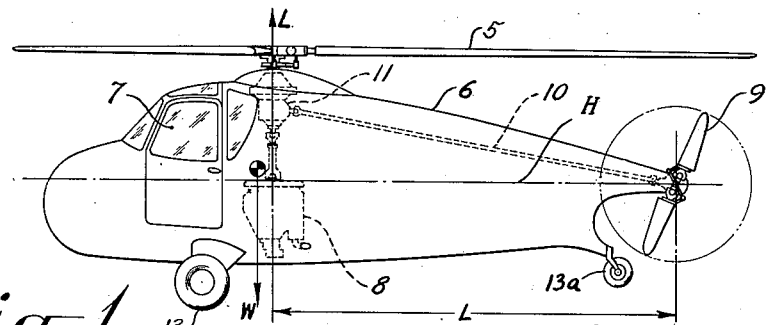
Figure 1 is a side elevational view of an aircraft incorporating the features of the present invention.
Figure 2:
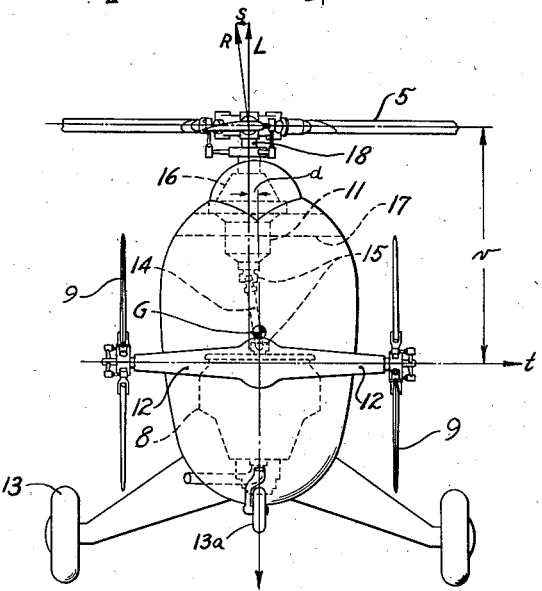
Figure 2 is a rear elevational view of the craft illustrated in Figure 1.

Figures 1 and 2 illustrate a helicopter having the main lifting rotor incorporating the blades 5 located above the fuselage 6. The occupants' compartment 7 is shown at the forward end of fuselage 6 and the engine 8 is located substantially directly below the rotor. The torque developed by the main rotor when being driven by the engine 8 is counteracted by means of a tail unit in the form of tail rotors 9 which are driven by driveshaft 10 connected with the transmission unit 11. The tail rotors 9 are mounted at the rear end of the fuselage 6 on lateral extensions 12. The fuselage is proportioned to position the tail rotors 9 underneath the outer portion of the rotor blades 5 in a position where they are able to receive the benefit of the crossflow from the main rotor operation and thus produce increased thrust as compared to their operation in undisturbed air. The use of two tail rotors in tandem allows a considerable decrease in the diameter of the torque rotors, thereby permitting the main lifting rotor to be kept close to the top of the fuselage 6. This arrangement of tail rotors is shown by way of example and is in accordance with my co-pending application Serial No. 662,728, filed April 17, 1946.

In accordance with this arrangement of rotors the torque correcting transverse thrust is in a plane considerably below the plane of the main rotor. This distance is indicated as distance $v$ in Figure 2, the combined thrust of the tail rotors being indicated by $t$. It will be noted that the craft is supported on the ground by main landing gear wheels 13 and a tail wheel 13a which is located close to the tail rotor to give adequate protection thereto.

Figure 3:
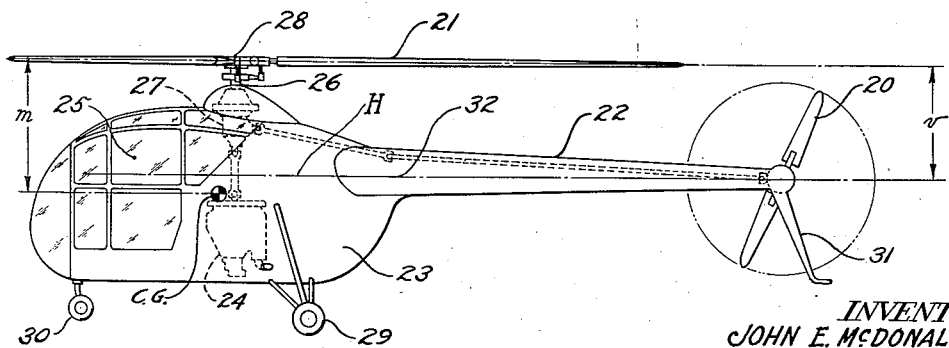
Figure 3 is a side elevational view of another configuration of aircraft to which the present invention is applicable.

In Figure 3 there is illustrated another configuration of helicopter incorporating the present invention. In this arrangement the tail rotor 20 is located beyond the radius of main rotor, a blade of which is shown at 21. A boom structure 22 forms a rearward extension of the main portion of the fuselage 23. The engine 24 is located in the fuselage 23, as also is the occupants' compartment 25. As in the case of the arrangement illustrated in Figure 1, the rotor hub 26, the transmission unit 27 and the engine 24, are supported generally below the center of rotation 28 of the rotor. The landing gear is of the tricycle type having main rear wheels 29 and a nose wheel 30. In order to protect the tail rotor 20 against accidental contact with the ground a skid member 31 is provided. With this arrangement for the tail rotor the overall height of the craft is kept at a minimum since the tail rotor does not project above the plane of the main rotor. In addition, the drive to the tail rotor may be kept comparatively straight and the need for gearing to change the direction of the driveshaft is eliminated. Such gearing is normally provided for helicopters having the rear end of the fuselage extension sharply upturned so as to locate the center of the tail rotor close to the plane of the main rotor.

Figure 4:
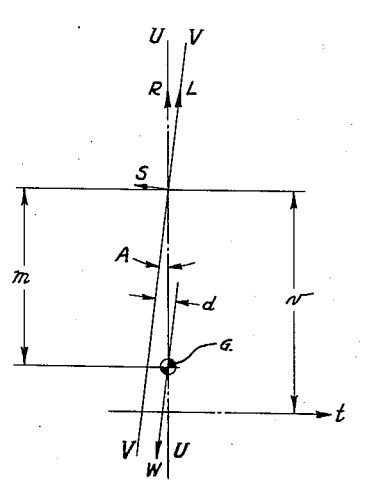
Figure 4 is a diagram illustrating the forces and moments involved in an aircraft having a configuration of the general nature with which the present invention is concerned.

The forces involved, for a conventional craft, are shown diagrammatically in Figure 4 but in this diagram the line UU represents the vertical center line of the craft in position on the ground before the flight forces have been applied. Also, the center of the rotor is indicated as being on the line UU directly above the center of gravity indicated by the letter G. In order to illustrate the magnitude of a typical inclination during powered operation with the above configuration an example will be given based on an aircraft of the approximate size and proportions illustrated in Figures 1 and 2.

Assuming an aircraft having a gross weight of 3,000 lbs. with a main rotor having a rotational speed of 230 R. P. M. and a power applicable to the main rotor of 260 H. P. the torque reaction of the main rotor will be—

$$T = \frac{63{,}000 \text{ H.P.}}{\text{R.P.M.}} = \frac{(63{,}000)(260)}{230} = 71{,}200 \text{ lbs.-in.}$$

In Figure 1 the distance of the tail rotor from the center line of the main rotor is indicated as L. Therefore, the lateral thrust needed at the tail rotor to couneract the above torque if $L=16$ ft. will be $$t = \frac{71{,}200}{(16)(12)} = 371 \text{ lbs.}$$

During flight such as, for example, hovering without forward motion, a lateral force S equal to the lateral thrust $t$ must be developed at the main rotor in order to balance the force $t$ at the torque rotors. The rolling moment developed in the aircraft will, therefore, be $tv$. If the vertical distance $v$ is 70 inches the rolling moment on the craft will, therefore, be $M=(371)(70)=26{,}000$ lb.-in. In order to counteract this moment and provide stabilized flight a lateral inclination of the craft must occur and an angular position of equilibrium will be assumed with relation to the vertical, which is indicated by the line VV. In this displaced position the weight W and the lift L which have equal values will be displaced a distance $d$ and will provide a counteracting moment $Ld$ equal to $tv$. The distance $$d = \frac{M}{W} = \frac{26{,}000}{3{,}000} = 8.68 \text{ in.}$$

If the vertical distance between W acting at the center of gravity G and the center of the rotor hub is $m$ the sine of angle A will be $d/m$. The lateral inclination will, therefore, be—

$$\text{angle } A = \sin^{-1}\frac{d}{m} = \sin^{-1}\frac{8.68}{68} = 7°\text{-}20'. \quad (m=68 \text{ in.})$$

The above example showing an angular displacement of 7°-20' will give a typical indication of the magnitude of forces and angles involved in a helicopter having a tail rotor thrust located underneath the main rotor a sufficient distance for clearance. It will be evident that hovering at the lateral inclination of 7° or more would be an uncomfortable attitude for the occupants. Furthermore, in landing, contact with the ground at this attitude would produce a considerable rocking tendency because of one wheel contacting the ground considerably before the other.

It will be noted that the center of gravity G may lie either above the horizontal plane H as in Figure 1 or below plane H as in Figure 3. A greater distance $m$ results in a smaller inclination or offset to balance a given rolling moment.

The present invention as indicated in Figure 2 provides for offsetting the main rotor an appreciable distance $d$ from the center of gravity G, or as shown in this example, from the vertical longitudinal center line of the ship. The relative amount of offset may vary according to the particular problem involved. In most cases it is desirable to provide an offset of at least one-half the amount required to give full correction under full power operation. With an offset of one-half the amount required by the method of calculation for $d$ illustrated in Figure 4, the maximum angular inclination under any condition of operation would be only slightly greater than 3½ degrees tilt. This amount of inclination is obviously much less objectionable than the 7 degrees indicated above. With this configuration during normal cruising operation the actual lateral tilt would be only one to two degrees, since under these conditions of operation the power applied to the main rotor may be reduced considerably (to 70% maximum for example), thus reducing the transverse thrust needed in the torque correcting rotors.

In some cases it may be preferred to arrange the offset of the main rotor to give approximately two-thirds correction of the maximum tilt. With this amount of offset the craft will fly substantially level in the lateral sense during normal cruising operation. For hovering operation and landing, which conditions of operation occupy a relatively small portion of the total flight time, the lateral inclination will be approximately one-third the 7°-20' inclination, or less than 2½ degrees. This small amount of inclination is almost unnoticeable and is not objectionable. During autorotational operation without power the craft will then have a lateral inclination approximately 4½ degrees. However, such operation occurs only a small portion of the total flight time and landings under this condition are comparatively infrequent.

The offset of the center of rotation of the main rotor may be readily accomplished without departing appreciably from normal structural and mechanical practice. The transmission system between the engine 8 and the rotor blades 5 usually includes, in addition to the gear reduction unit 11, a driveshaft 14 between the engine and the reduction unit 11. Universal joints 15 are included in the driveshaft so that the rotor hub which may be attached to the gear unit 11 may be supported in the fuselage structure in an offset position, the universal joints 15 permitting accommodation of the driveshaft for this offset. In constructions where the engine, transmission and rotor hub form a single unit the complete system may be offset slightly from the center line of the fuselage. As illustrated in Figure 2 the transmission unit 11 together with the hub 16 are supported in the fuselage by structure 17. The hub structure includes a rotating axle 18 to which the rotor is attached.

In order to control the magnitude of the transverse thrust $t$, the blades of the tail rotor units such as 9 in Figure 1 and 20 in Figure 3 are mounted to permit variation of their pitch by means of suitable mechanism. In this way the amount of thrust may be controlled to meet the varying torque requirements throughout the range of operation from no power applied to the main rotor to full power. As is the normal practice the tail rotor units provide for directional control as well as counteracting the torque of the main rotor. The pitch control mechanism is preferably connected to rudder pedals thereby providing for directional control of the craft in the usual manner.

My arrangement for mounting the lifting rotor in a laterally offset position with respect to the center of gravity of the aircraft results in greatly reducing the amount of lateral inclination produced by the transverse thrust of a tail rotor unit downwardly offset from the plane of the main rotor. Such a configuration is particularly advantageous in helicopters where the tail rotor thrust is located underneath the main rotor, since in this arrangement the increase in required tail rotor thrust and in the offset needed for clearance produces a relatively large lateral tilting action. With the main rotor eccentrically mounted in accordance with the present invention this "underneath" location for the tail rotor or rotors becomes practical because the lateral inclination during different modes of flight may be kept within reasonable operating values. Thus both the comfort of the occupants and the safety of operation, particularly during landing and takeoff, are greatly improved.

In the claims to follow, such terms as "vertical" and "horizontal" are intended to refer to directions defined by the structure of the aircraft itself when it is in a condition of rest on level terrain.

Throughout the specification and claims, the terms "rolling" and "rolling moments" will be understood as referring to a tilting about the center of rotation of the main lifting rotor.

I claim:

1. A helicopter having a main lifting rotor, a fuselage supported below said main lifting rotor, a tail rotor supported on said fuselage underneath the outer periphery of said main rotor, the center of rotation of said main rotor being laterally offset from the plane of symmetry of said fuselage to the side opposite from the direction of thrust of said tail rotor when the tail rotor is operating to counteract the torque developed during power operation of said main rotor.

2. A helicopter having a main lifting rotor, a fuselage supported below said main lifting rotor, a counter-torque tail rotor supported at the rear of said fuselage on a transverse axis, said main rotor being mounted unsymmetrically relative to the longitudinal vertical plane of symmetry of the fuselage, the direction of offset of the main rotor being opposite to the direction of thrust of said tail rotor when the tail rotor is operating to produce a counter-torque.

3. A helicopter comprising a fuselage, a lifting rotor, and a torque-counteracting means, said means having a transverse thrust axis spaced horizontally from the lifting rotor axis and spaced vertically from the plane of the lifting rotor, the center of said lifting rotor being offset laterally from the vertical, longitudinal plane of symmetry of the fuselage and in a direction to oppose the rolling moment due to the said means.

4. A helicopter comprising a fuselage, a lifting rotor with its plane of rotation generally above the center of gravity of the fuselage, a tail rotor having a transverse thrust axis spaced horizontally from the lifting rotor axis and spaced vertically from the plane of the lifting rotor, the center of said lifting rotor being offset laterally with respect to the vertical, longitudinal plane of symmetry through the center of gravity of said fuselage, and in a direction to oppose the rolling moment due to the tail rotor.

5. A helicopter comprising a fuselage, a lifting rotor, and a torque-counteracting means, said means having a transverse thrust axis spaced horizontally from the lifting rotor axis and spaced vertically below the plane of the lifting rotor, the center of said lifting rotor being offset laterally from the vertical, longitudinal plane of symmetry of the fuselage and in a direction to oppose the rolling moment due to the said means.

6. A helicopter comprising a fuselage, a lifting rotor, a torque-counteracting tail rotor, said tail rotor having a transverse thrust axis, spaced horizontally from the lifting rotor axis, and spaced vertically below the plane of the lifting rotor at a distance at least equal to the blade tip radius of said tail rotor, the center of said lifting rotor being offset laterally from the vertical, longitudinal plane of symmetry of the fuselage and in a direction to oppose the rolling moment due to the tail rotor.

7. A helicopter comprising a fuselage, a lifting rotor, and a torque-counteracting means, said means having a transverse thrust axis spaced horizontally from the lifting rotor axis and spaced vertically from the plane of the lifting rotor, the center of said lifting rotor being offset laterally from the vertical, longitudinal plane of symmetry of the fuselage and in a direction to oppose the rolling moment due to the tail rotor, said transverse axis being located closer to a horizontal plane through the center of gravity of said fuselage than to the plane of said rotor.

JOHN E. McDONALD.

REFERENCES CITED

The following references are of record in the file of this patent:

UNITED STATES PATENTS

| Number | Name | Date |
|---|---|---|
| 1,982,968 | Stalker | Dec. 4, 1934 |